F. A. READ.
BUTTONHOLE SEWING MACHINE.
APPLICATION FILED JUNE 27, 1917.
1,345,025.
Patented June 29, 1920.
9 SHEETS—SHEET 4.
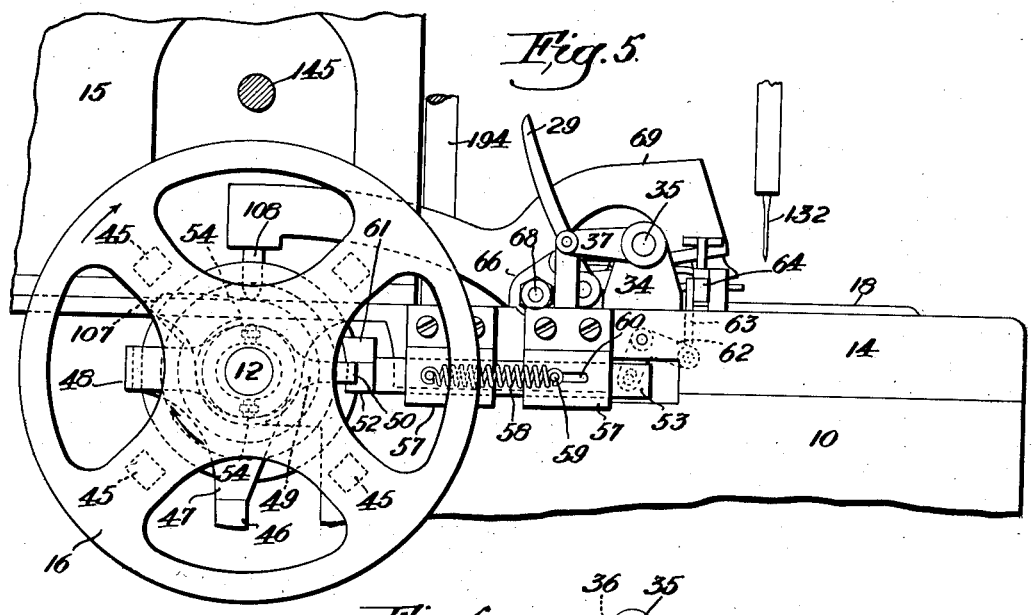
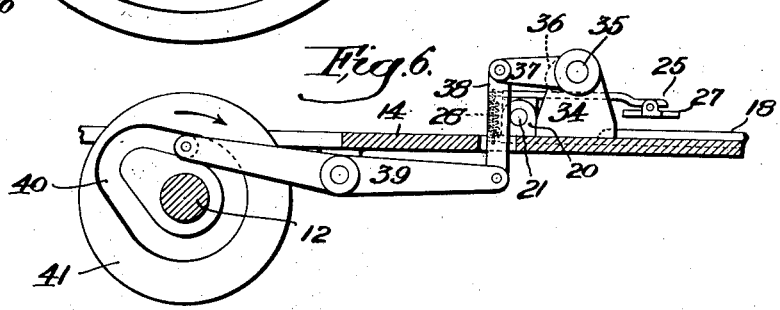
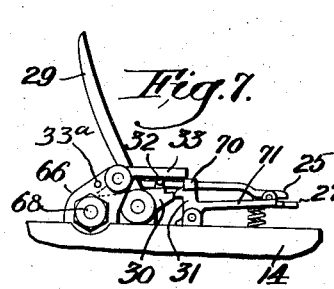
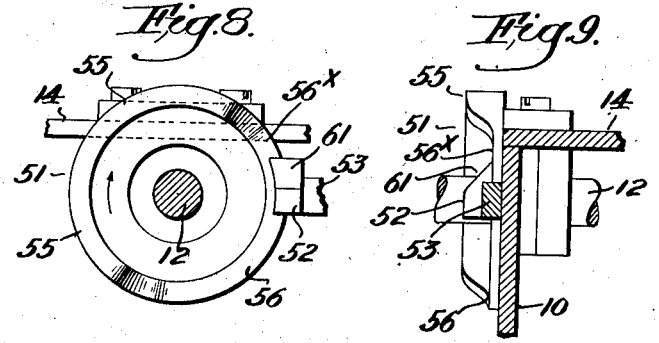
Inventor:
Fred A. Read,
by Edward F. Allen
his Atty.

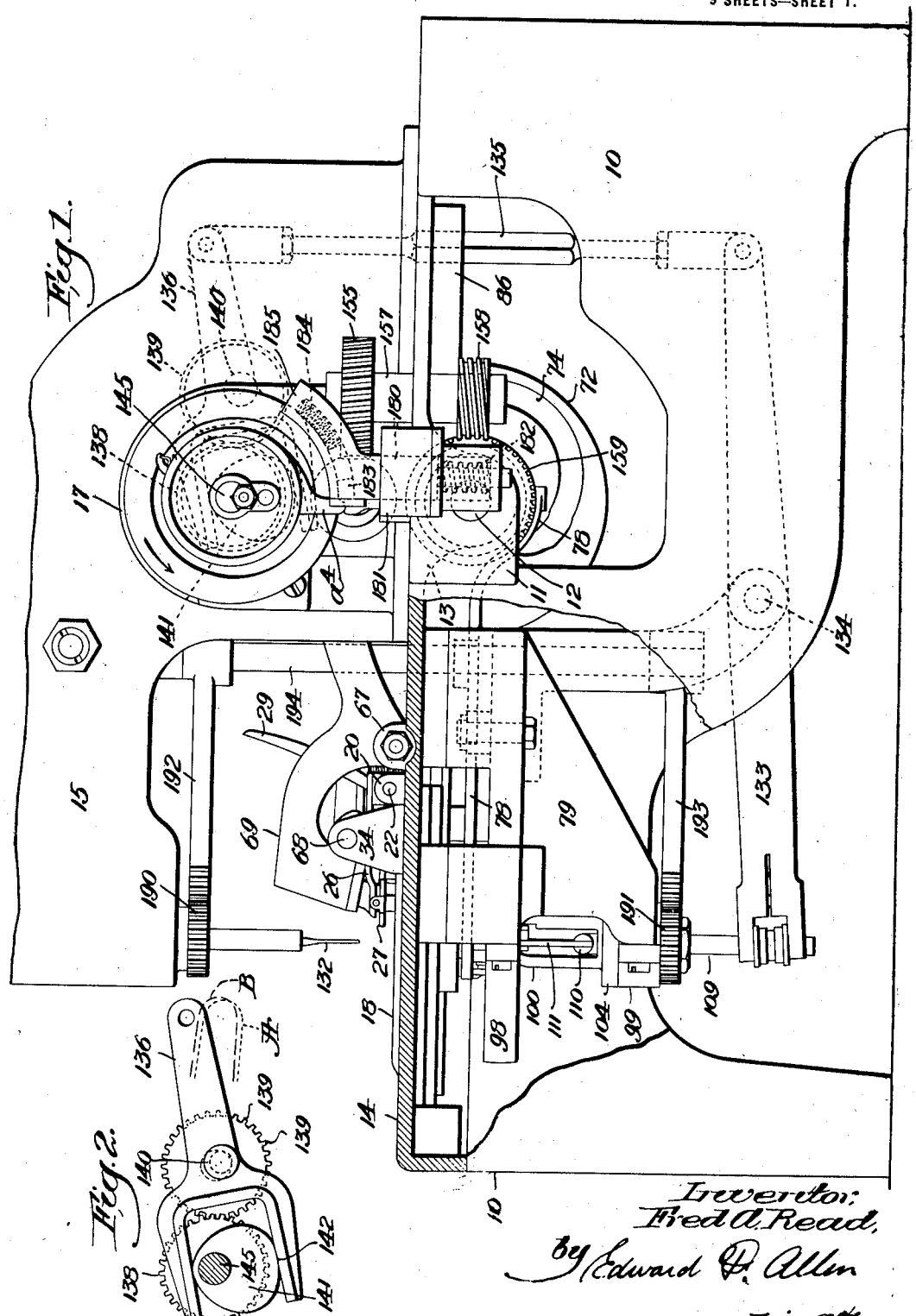

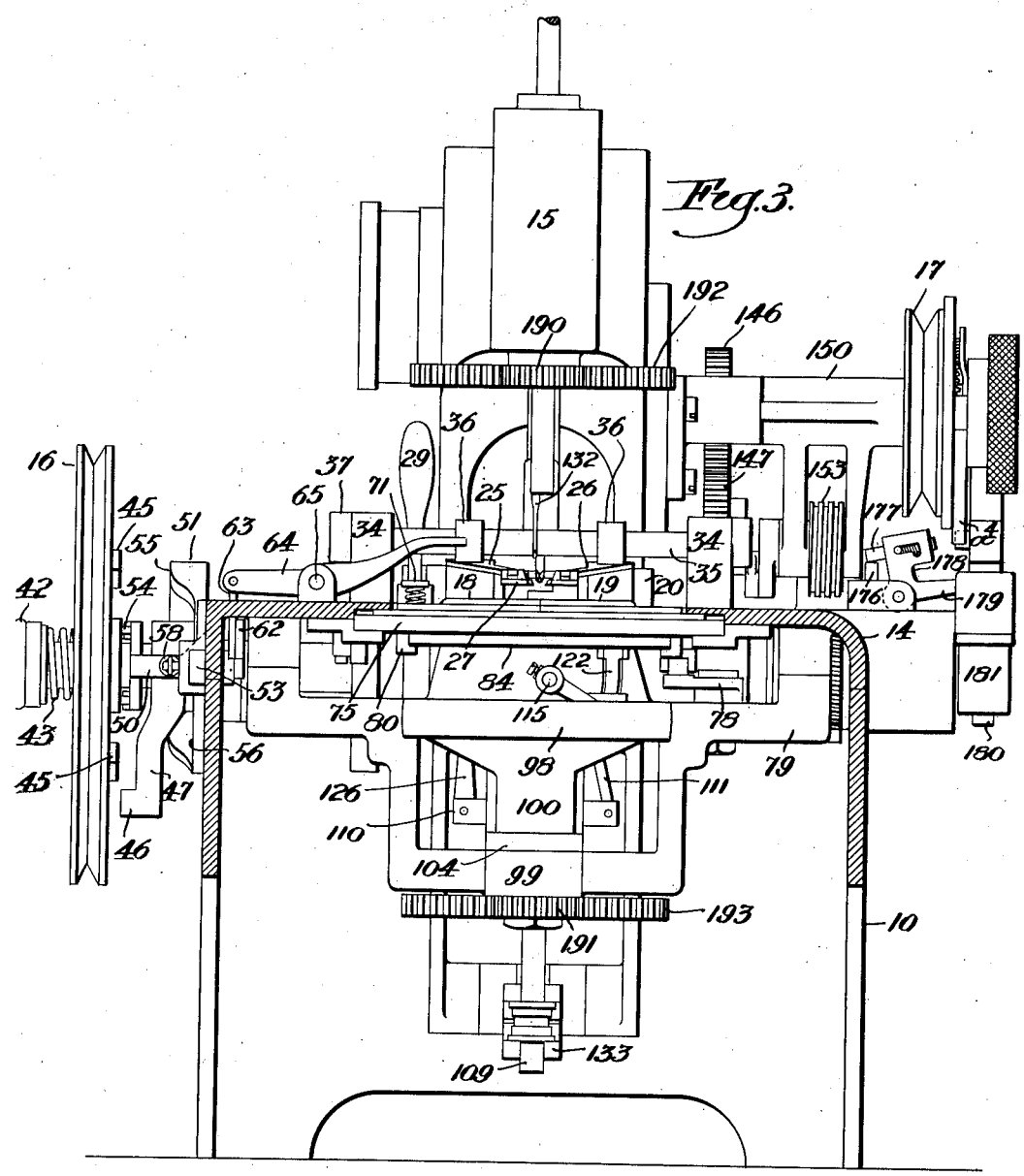

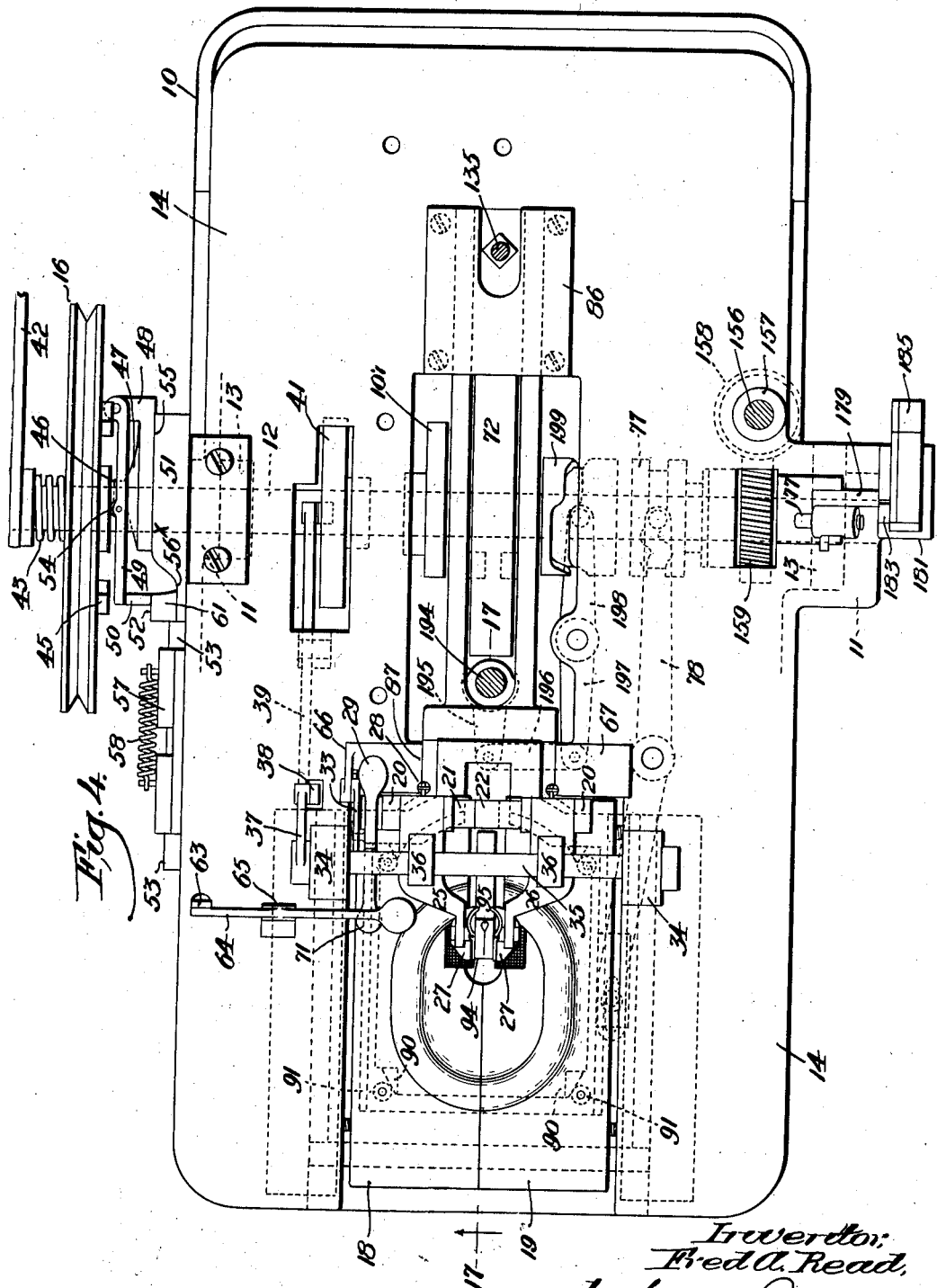

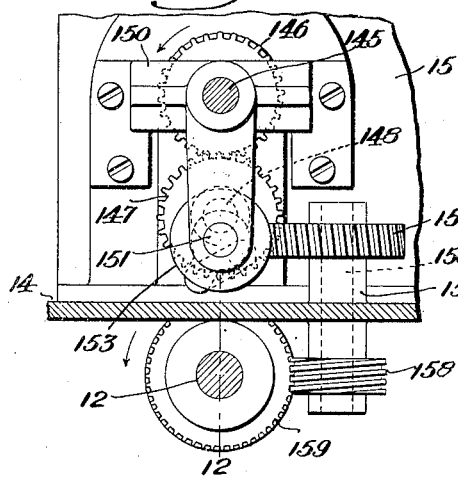
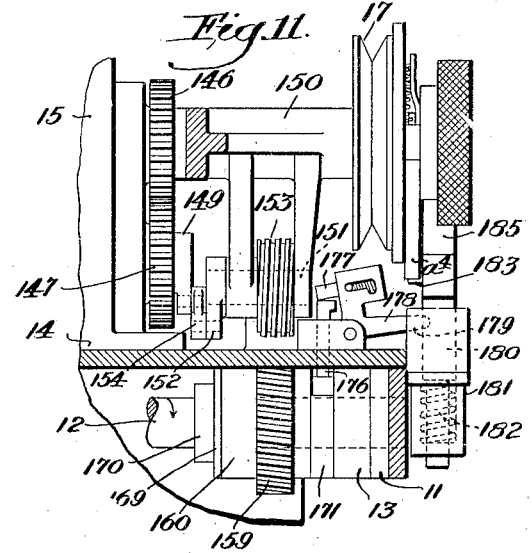
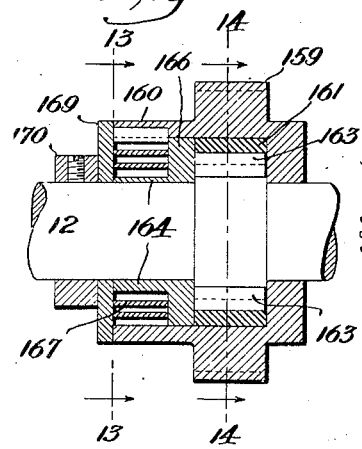
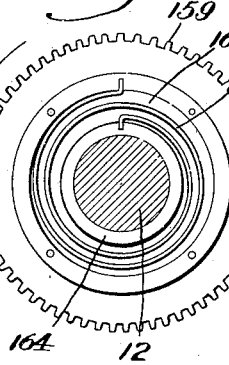
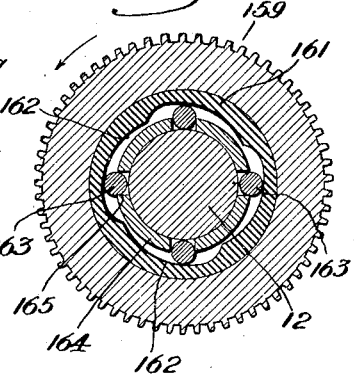
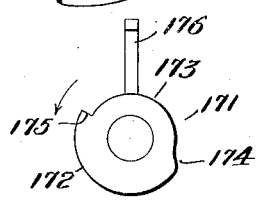
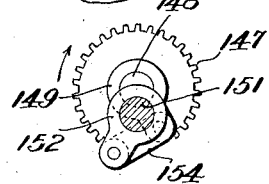

F. A. READ.
BUTTONHOLE SEWING MACHINE.
APPLICATION FILED JUNE 27, 1917.
1,345,025.
Patented June 29, 1920.
9 SHEETS—SHEET 6.
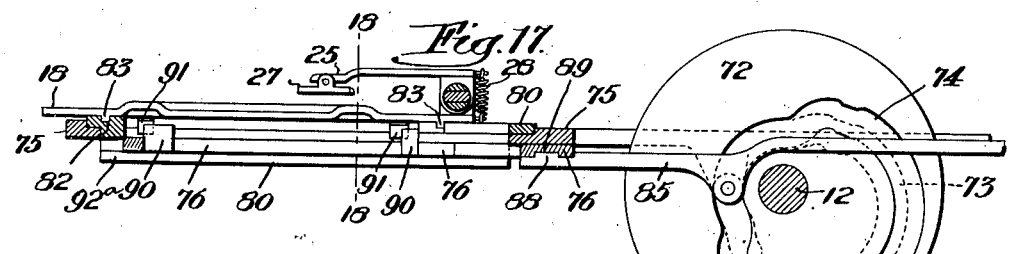
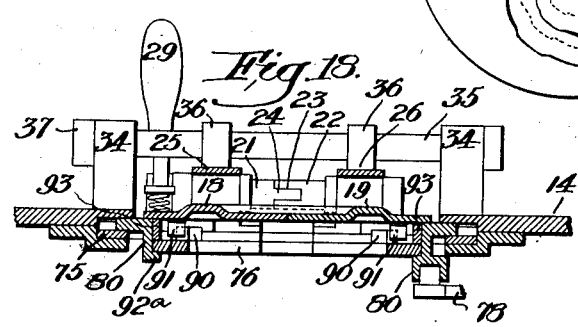
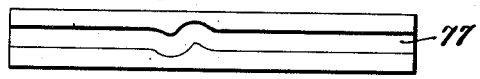
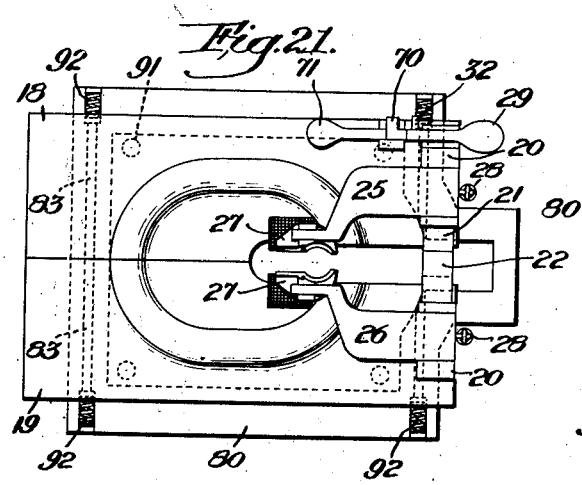
Inventor:
Fred A. Read,
by Edward F. Allen
his Atty.

F. A. READ.
BUTTONHOLE SEWING MACHINE.
APPLICATION FILED JUNE 27, 1917.

1,345,025.

Patented June 29, 1920.
9 SHEETS—SHEET 7.

Inventor:
Fred A. Read,
by Edward H. Allen
his Atty.

F. A. READ.
BUTTONHOLE SEWING MACHINE.
APPLICATION FILED JUNE 27, 1917.

1,345,025.

Patented June 29, 1920.
9 SHEETS—SHEET 8.

Inventor:
Fred A. Read,
by Edward P. Allen.
his Atty.

F. A. READ.
BUTTONHOLE SEWING MACHINE.
APPLICATION FILED JUNE 27, 1917.
1,345,025.
Patented June 29, 1920.
9 SHEETS—SHEET 9.
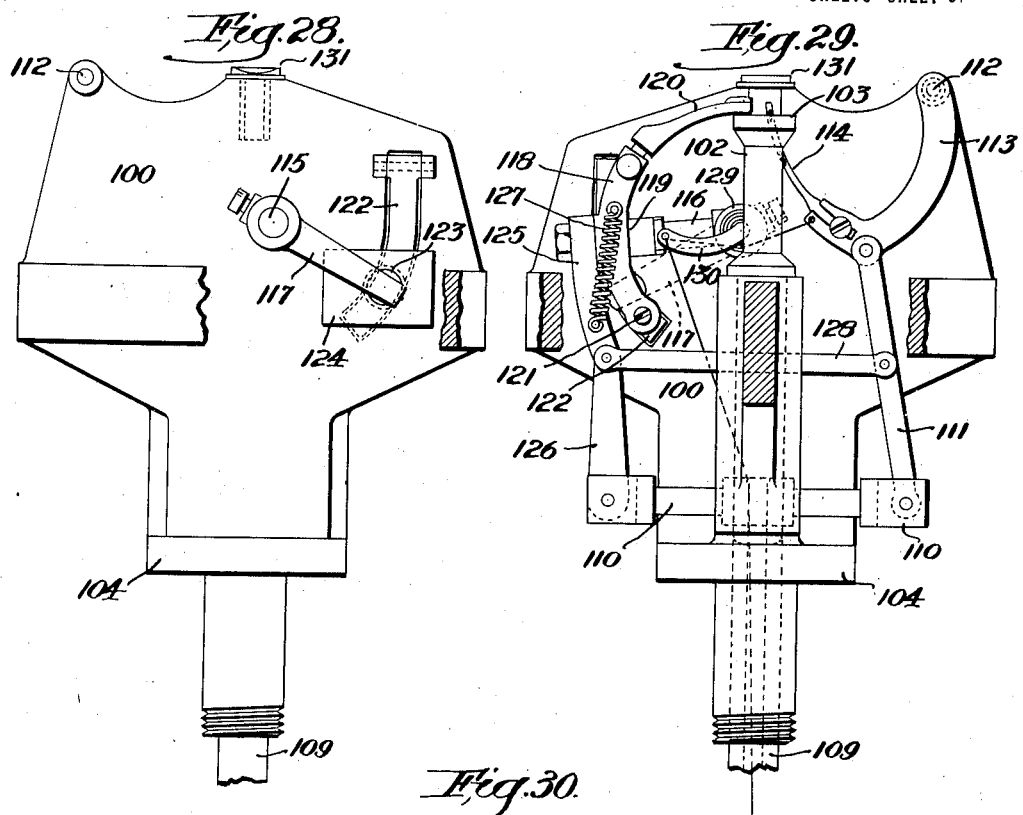
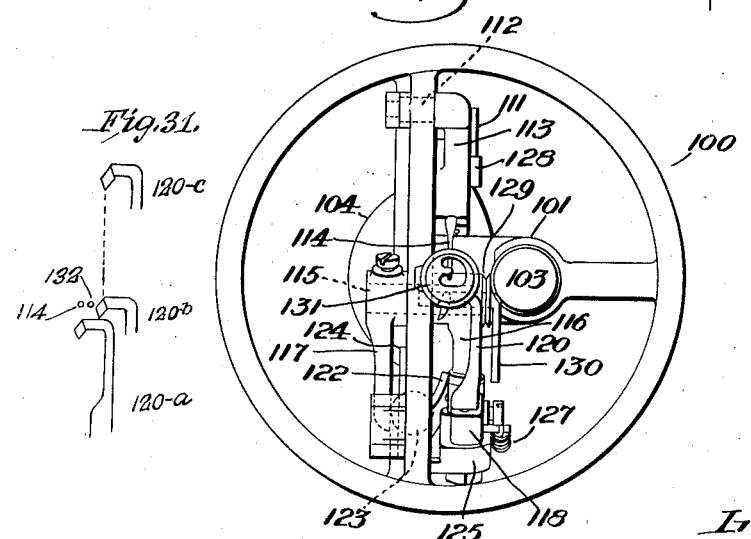
Inventor:
Fred A. Read,
by Edward F. Allen
his Atty.

UNITED STATES PATENT OFFICE.

FRED A. READ, OF LYNN, MASSACHUSETTS, ASSIGNOR TO REECE BUTTONHOLE MACHINE COMPANY, OF BOSTON, MASSACHUSETTS, A CORPORATION OF MAINE.

BUTTONHOLE-SEWING MACHINE.

1,345,025.  Specification of Letters Patent.  Patented June 29, 1920.

Application filed June 27, 1917. Serial No. 177,392.

*To all whom it may concern:*

Be it known that I, FRED A. READ, a citizen of the United States of America, and a resident of Lynn, in the county of Essex and Commonwealth of Massachusetts, have invented certain new and useful Improvements in Buttonhole-Sewing Machines, of which the following is a specification.

This invention relates to buttonhole sewing machines such as the well-known Reece type, and has for its object the production of a machine that is simple in construction, being composed of comparatively few operating parts so arranged that access to them is readily obtained for the purposes of adjustment or the removal of worn or broken parts.

It is a feature of this invention to so construct the machine that the main or cam shaft serves as a pivot about which the work plate and attached stitch frame may be swung when it is desired to effect adjustment, or for examination of the mechanism located beneath the work plate.

For this purpose the cam shaft is provided with suitable bearings in the base and work plate of the machine, and in this instance the cam shaft is designed to be driven in the same direction as the stitch shaft, thereby obviating the use of the bothersome cross belt heretofore used in this type of machines.

Another important feature of the invention is the novel manner of controlling the work clamps by means of which it is possible to either automatically or manually clamp the work when starting to make a buttonhole, and to automatically spread the clamp plates at the proper time, after which the clamp fingers may be released and reclamped if necessary, leaving the clamp plates in spread condition and they will remain in spread condition until the buttonhole cycle has been completed, at which time the spreading devices will be automatically withdrawn and the clamps will assume their normal unclamped position.

Another important feature of the invention is the novel and simple manner in which the work clamp plates are controlled for their longitudinal and lateral movements which are positive and preferably cam controlled, suitable adjustment being provided for, and the use of springs made unnecessary.

The extremely simple and inexpensive under-stitching mechanism herein, together with the novel arrangement of the cutting block and anvil therefor form other important features of this invention.

The continuous feed mechanism herein disclosed which is automatically retarded when the needle is in the work and is automatically accelerated when the needle is out of the work, is considered a novel and valuable improvement in this class of machines, a positive feed being assured, which greatly aids in the production of high class work and the harmonious running of the machine in general.

Other novel and valuable features of this invention will be further pointed out in the following specification and in the claims hereinafter given.

Of the drawings:

Figure 1 represents in side elevation, partially broken away, a buttonhole sewing machine embodying this invention.

Fig. 2 represents a portion of the actuating devices for the under stitch mechanism in detail.

Fig. 3 represents a left or front end elevation of the machine shown in Fig. 1, the work plate and base being broken away for clearness.

Fig. 4 represents a top plan view of the machine shown in Fig. 1 with the stitch frame and certain other parts omitted.

Fig. 5 represents a left side elevation of portions of the machine shown in Fig. 1 including the starting and cutting mechanisms.

Fig. 6 represents a detail of the devices to automatically clamp the work.

Fig. 7 represents a detail of the manually operated devices to clamp the work and the devices to release the clamps manually before and automatically at the completion of the buttonhole.

Figs. 8 and 9 represent detail views of the cam that controls the action of the clamping and cutting operations and initial and final positioning of the work clamp plates.

Fig. 10 represents in part right side elevation the means to drive the main or cam shaft from the stitch shaft to cause the fast and slow feed during the stitching operation.

Fig. 11 represents a left or front elevation of the parts shown in Fig. 10 showing also some of the devices that control the time of operation of the stitch shaft.

Fig. 12 represents a vertical section through the clutch on the main or cam shaft shown also in Figs. 10 and 11.

Fig. 13 represents a section on the line 13—13, Fig. 12.

Fig. 14 represents a section on the line 14—14, Fig. 12.

Fig 15 represents a right side elevation of the cam and its follower that controls the starting and stopping of the stitch shaft.

Fig. 16 represents in detail the variable speed device that indirectly controls the action of the feed mechanism.

Fig. 17 represents a part section on the line 17—17 Fig. 4, showing the cam and connection to spread the work clamp plates and the cam to operate said plates.

Fig. 18 represents a part section on the line 18—18 Fig. 17.

Fig. 19 represents a developed view of the cam controlling some of the lateral movements of the work clamp devices.

Fig. 20 represents a developed view of the cam controlling the swing of the upper needle and the under mechanism or stitch block.

Fig. 21 represents in plan view the work clamp plates and the carrier frame upon which they are adapted to slide laterally.

Fig. 28 represents a part front elevation of the under stitch mechanism or block.

Fig. 29 represents a reverse view of Fig. 28, some of the parts being broken away for clearness.

Fig. 30 represents a top plan view of the mechanism shown in Figs. 28—29 as it would appear when viewing Fig. 1.

Figure 22:
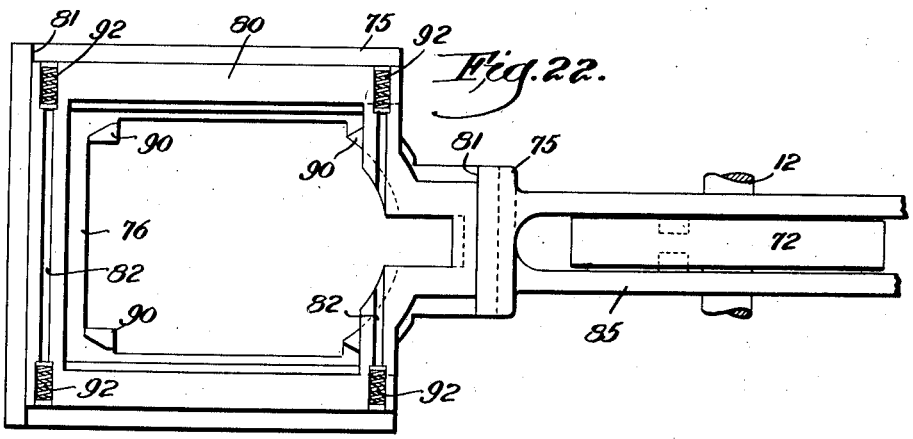
Fig. 22 represents in plan view a detail of the carrier frames for the work clamp plates with the said plates removed therefrom.
Figure 23:
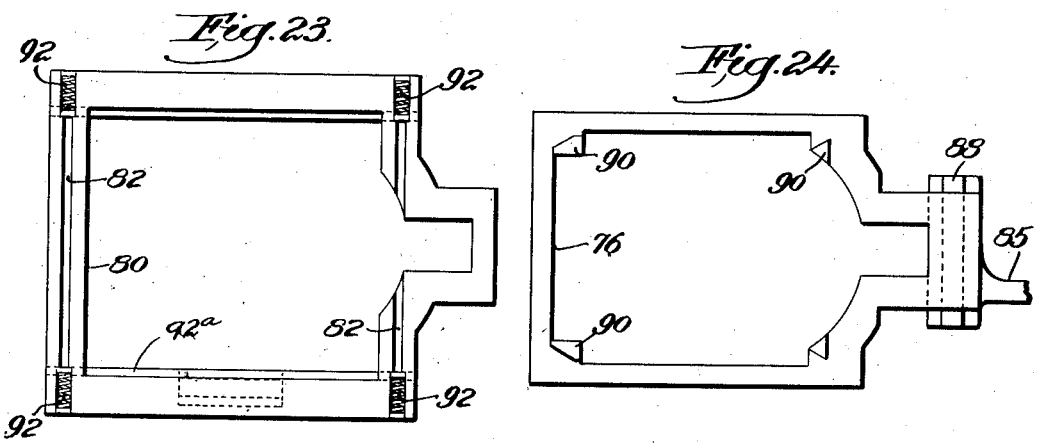
Fig. 23 represents in detail a plan view of the frame upon which the work clamp plates slide laterally when spread.

Fig. 31 in top plan view is a diagram indicating the path of the looper with respect to the needles.

Similar characters designate like parts throughout the several figures of the drawings.

Referring to the drawings,—

The stand or base 10 has the bearings 11 adapted to support the main or cam shaft 12 which in turn acts as a pivotal support, through the depending lugs 13, for the work table 14 to which is secured the overhanging arm or stitch frame 15. This method of pivoting the work table enables the operator to tilt it at any time to inspect the mechanism beneath it without the necessity of first throwing off the driving belts so that the table could be tilted as is the case in other machines of this type. As the main driving pulley 16 is loosely mounted on the shaft 12 it is obvious that it is not necessary to throw off its belt (not shown) when the table is to be tilted. The belt (not shown) for the stitch shaft pulley 17 may also retain its connection as it is obvious that one of several well-known devices may be used to automatically take up the slack in said belt when the operator tilts the table in order to gain access to the mechanism beneath it. It will therefore be readily understood that this construction is of considerable value as a time and trouble saver, and so far as known is new in this class of machines.

As there are many important features contained in this invention it is thought best to describe each one separately as far as it is possible to do so but not necessarily in the order of their importance.

When a buttonhole is to be made the work must be either manually or automatically clamped to the work plate and as it is the first operation to be performed it will now be described.

The work clamp plates 18 and 19, which are adapted to move longitudinally and laterally in unison, and which also have lateral movements relatively to each other, have suitable bearings 20 to support a two-part rock shaft 21, 22, the portion 22 being grooved or slotted at 23 to receive the extension or tongue 24 extending from the portion 21. This arrangement permits the two-part shaft 21, 22 to remain in rocking engagement when the clamp plates 18 and 19 are spread apart by mechanism to be hereinafter described, and permits of the removal of one or the other of the said plates when it is found necessary to inspect the mechanism located beneath them.

Secured to the shaft 21, 22 are the clamp members or fingers 25, 26 having the usual pivoted work contact devices 27, said fingers being normally held in the position shown in Fig. 17 by means of springs 28.

Fast to the shaft 21 (see Figs. 4, 5, 7, 18, and 21) is a hand lever 29 the hub of which has forwardly extending therefrom the latch 30 which is adapted to at times engage the spring pressed dog 31 clearly shown in Fig. 7.

Laterally extending from the latch 30 is a studlike projection 32 adapted to engage the under side of a pivoted bunter 33 for a purpose which will be presently described.

If it is desired to manually clamp the work before starting the operation of buttonhole making, the operator will grasp the hand lever 29, which is fast to the two-part rock shaft 21—22, and move it forwardly until the latch 30 passes below the hooked portion of the dog 31, whereupon the spring will force the hooked dog 31 into locking contact with the said latch 30 where it would ordinarily remain until the buttonhole making operation is completed. As before stated the clamp fingers 25—26 are fast with the shaft 21, 22 and obviously when the hand lever 29 is moved as just described the clamp fingers will be held firmly against the work holding it tightly against the work clamp plates 18 and 19.

Provision is herein made, as previously stated, to automatically clamp the work when the machine is started for its cycle of operations.

As best seen in Figs. 3, 4, 6, and 18, the work table 14 has upwardly extending therefrom the bearings 34 for the rock shaft 35 upon which are rigidly secured the cams 36 spaced in such manner that each one is in engaging position with a clamp finger 25, 26.

Fast to the rock shaft 35 (see Figs. 4, 6) is a lever 37 which is connected by a link 38 to a lever 39 pivoted at its middle portion to the table 14. At its left end the said lever 39 has a cam roll adapted to be guided in the groove 40 of the disk 41 fast on the main or cam shaft 12. When the machine is started the cam groove 40 immediately acts through the beforementioned levers 37, 39, and link 38, to rock the shaft 35 which has fast thereon the cams 36. The cams 36 in turn will depress the fingers 25, 26, rocking the shaft 21, 22 until the latch 30 is engaged by the dog 31 as previously described for the manual operation of clamping the work.

The cam groove 40 is so designed that after it has rocked the shaft 21, 22, and the same has been locked in work clamping position, it will immediately start to release the cams 36 from contact with the fingers 25, 26, relieving the work clamp plates 18, 19 from pressure from this source and leaving the said plate free to be easily moved by mechanism and for purposes that will be hereinafter explained.

From the foregoing it will be seen that whether the clamping of the work has been done manually or automatically, the work is firmly held between the fingers 25, 26 and the plates 18 and 19, and as the devices that retain the fingers and plates in such position are mounted on and carried by the plate 18, the said plates are free from external pressures which exist in other machines of this type and which are detrimental to the working qualities of the clamp plates in use.

As it is essential that the clamp fingers shall be automatically released when the buttonhole is finished, the pivoted bunter 33 (previously briefly referred to) is instrumental in causing this action and will now be described.

Upwardly extending from the bed plate 14 are the bosses 66 and 67 which serve as bearings for the shaft 68 of the cutter 69 to be further described. The bunter 33 is pivotally mounted to one of the bosses as 66 and has a rearward extension adapted to engage a pin 33$^a$ to limit the downward movement of said bunter 33. Normally the front end of the said bunter rests on top of a lateral projection 70 extending from the dog 31 and in fact is held in that position by means of the stud 32 extending from the latch 30.

When the shaft 21, 22 is rocked by means of the hand lever 29 or the automatic action of the cams 36, the latch 30 will be swung downwardly into locking engagement with the dog 31 and the stud 32 will be moved with it and away from the bunter 33. At the proper time the work clamp plates 18, 19 will move forwardly in unison to their proper positions for the stitching operation for one side of the buttonhole, and laterally for the eye, then rearwardly to stitch the other side of the buttonhole and on the last end of their rearward movement when the buttonhole is completed the bunter 33 will engage the projection 70 and force the dog 31 forwardly and release the latch 30.

From the above descriptions in connection with Fig. 7 of the drawing, it is believed that the automatic release of the clamp fingers will be understood.

It is also essential to so construct the clamp devices that they may be released and replaced again manually at any stage of the buttonhole making operation, and for that purpose the dog 31 has a forwardly extending finger piece 71 that may be depressed by the operator when the clamp fingers are to be released. It sometimes happens that a thread will break or that some minor repairs or adjustments to the machine are necessary, and discovered before the buttonhole has been completed. At such time the operator will stop the machine by means of the usual pedal control (not shown) and if found necessary to remove the work from the clamp plates the finger piece 71 will be depressed as above described and the clamp fingers 25, 26 will be released and the work thereafter removed from beneath them.

Before describing the mechanism for moving the clamp plates 18, 19, the main or cam shaft 12 and some of the parts carried thereby will be described, particularly the mechanism to start the machine on its cycle of operations.

As best seen in Figs. 3 and 4 the shaft 12 has fast thereto the usual handle or crank 42 shown partially in Fig. 4, and omitted from Fig. 5 for convenience, the hub of which acts as an abutment for the coiled spring 43. The said spring 43 is interposed between the said hub of the crank 42 and the hub of the constantly driven pulley 16 which is loose on the shaft 12 and is provided with the lugs 45. The tendency of the spring 43 is to force the pulley 16 and the lugs 45 carried thereby to the right (see Fig. 3) so that one of the lugs 45 will engage the laterally extending portion 46 of a lever 47 fast on the shaft 12.

Normally the lugs 45 and the extension 46 will be held from contact by the means now about to be described. The hub of the lever 47 has extending therefrom a bearing 48 for the pivoted lever 49 of such construction as to straddle the shaft 12, the said lever having a laterally extending portion 50, which is adapted to at times engage a stationary circular cam 51 fast to the work table 14. In the stopped or normal position of the machine as shown herein, the portion 50 is held from engagement with the cam 51 by means of the head 52 of a slidable bolt 53 which will be described later.

The pivoted lever 49 has mounted thereon the contact rollers 54 (see Figs. 4 and 5) which engage the face of the hub of the pulley 16, and in the position shown the lugs 45 are held from contact with the portion 46 by reason of the position of the lever 49 which forces the pulley 16 toward the crank 42 against the action of the spring 43. It will be noted that the cam 51 is provided with the high and low portions 55, 56 respectively for a purpose to be described.

The bolt 53 is slidably mounted in suitable bearings 57 fast to the table 14 and is held in the position shown in Fig. 5 by means of the spring 58, one end of which is fast to the left bearing 57 and its other end fast to a pin 59, extending through a slot 60 of the right bearing 57, from the bolt 53. The upper edge of the head 52 of the bolt 53 is beveled as at 61 to enable the extension 50 of the lever 49 to ride upon the head 52 when the machine is about to be stopped as will be explained. The right hand end of the bolt 53 has a pin and slot connection with one arm of the bell crank 62 pivoted to the table 14, the other arm being connected by a link 63 with a manually operated lever 64, (see also Fig. 3) pivoted to the table 14 at 65.

In order to start the machine the operator will depress the right hand end of the lever 64, and through the link and bell crank connection, the bolt head 52 will be withdrawn from between the portion 50 and the cam 51, whereupon the spring 43 will rapidly force the pulley 16 and its lugs 45 toward the lever 49 a sufficient distance to allow of the engagement of one of the lugs 45 with the portion 46 of the lever 47. As the pulley 16 is loose on the shaft 12 and constantly rotating at a low rate of speed and the lever 47 is fast on the shaft 12 the engagement of a lug 45 with the portion 46 will cause the shaft 12 to rotate in the direction of the arrow. The lever 49 will of course rotate with the lever 47 and will continue to do so as long as the portion 50 of the lever 49 is riding on the low portion 56 of the cam 51, but when the high portion 55 of the cam 51 or the head 52 of the bolt 53 is reached by the said portion 50 the pulley will be forced toward the crank 42 by the lever 49 and the shaft 12 will come to a stop because of the disengagement of the portion 46 with one of the lugs 45.

It will be understood that when the operator has pressed the lever 64 and the machine has started the said lever 64 must be released to allow the bolt 53 to assume its normal position to effect the final disengagement of the portion 46 with one of the lugs 45 to stop the machine preparatory to the making of another buttonhole.

The mechanism that imparts the longitudinal and lateral movements to the work clamp plates seems to come next in order and will now be described.

At approximately the middle of the shaft 12 and fast thereto, the disk 72 is located, the said disk having the cam grooves 73, 74 on opposite faces thereof, the groove 73 being designed to control the operation of the main carriage or frame 75 which has movements longitudinally of the machine, only, and the groove 74 actuates the spreader frame 76 which has both longitudinal and lateral movements, the groove 74, however, imparting only longitudinal movement.

The lateral movements for the clamp plates 18, 19 which must occur when stitching around the eye of the button, are controlled by the cam 77 also fast on the shaft 12 (see Figs. 4 and 19).

Coacting with the cam 77 is a lever 78 pivoted to a bracket 79, designed to support the under stitch-forming mechanism, said lever having a roller at its right end (see Fig. 4) adapted to engage the groove of the cam 77 and at its left end another adjustable roll adapted to engage the inverted U-shaped groove in the under side of the laterally movable frame or carrier 80 upon which the clamp plates 18, 19 slidably rest.

The frame 80 is adapted to move laterally of the frame 75 in suitable ways or guides 81 and the clamp plates 18, 19, are arranged to slide from and toward each other on the frame 80 being guided by means of the grooves 82 in the frame 80 and the splines or tongues 83 depending from the clamp plates 18, 19. It will therefore be readily understood that the clamp plates 18 and 19 have longitudinal movements in unison, lateral movements in unison, and lateral movements relatively to each other.

Figure 24:
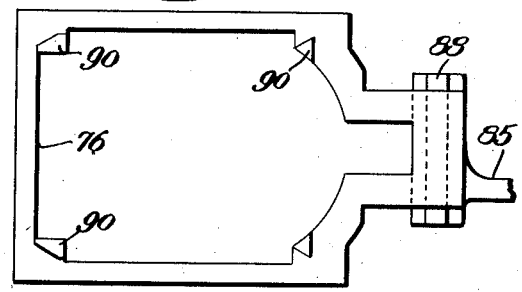
Fig. 24 represents in detail a plan view of the movable frame that spreads the work clamp plates.
Figure 25:
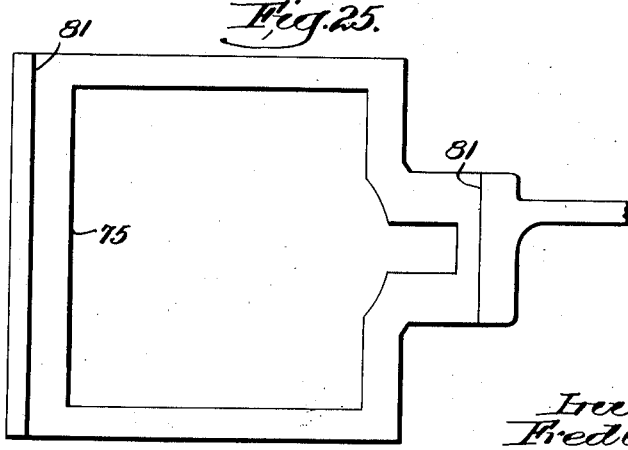
Fig. 25 represents in detail a part plan view of the main carrier frame for the work clamp plates.
Figure 26:
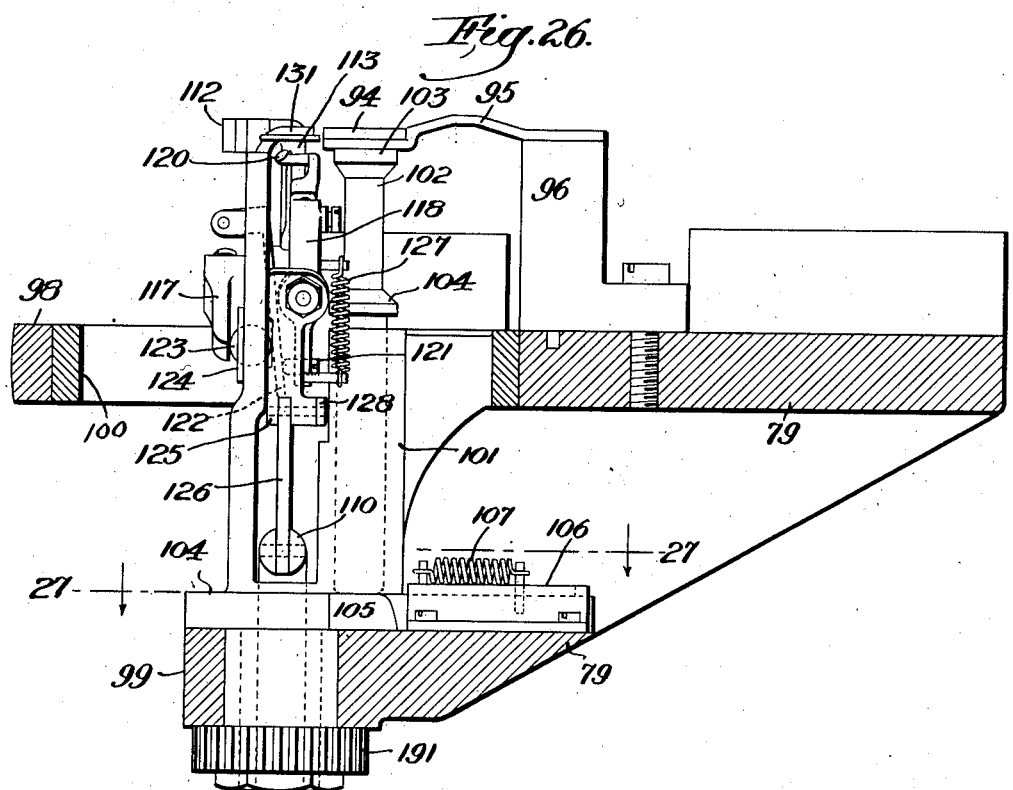
Fig. 26 represents in right hand elevation the under mechanism or stitch block, the bearings being broken away for clearness.
Figure 27:
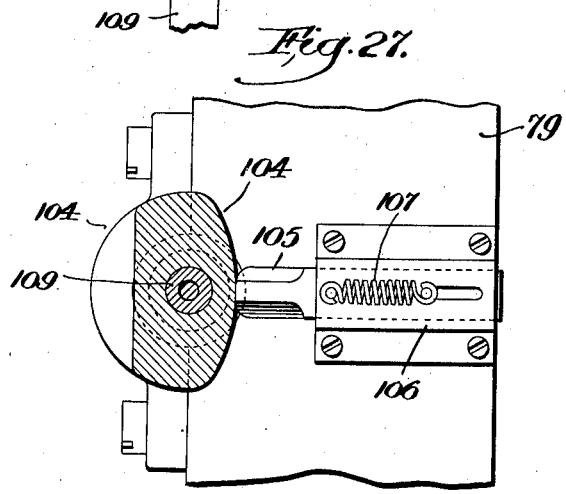
Fig. 27 represents a section on the line 27—27, Fig. 26.

Mounted inside the frame 80 and longitudinally movable relatively thereto is the spreader frame 76, which is actuated longitudinally by a rearwardly extending tail piece 85 (see Figs. 4, 17, and 24) on the side piece 85 of which is mounted a roll which engages the cam groove 74 of the disk 72. The tail piece 85 finds suitable bearings 86 and 87 on the table 14 (see Fig. 4) and at its left end (see Figs. 17 and 24) has a guide rib 88 which enters a guideway 89 on the under side of the frame 76 whereby the frame 76 receives longitudinal movements from the tail piece 85, and by means of the rib 88 and guideway 89 may partake of the lateral movements necessary when the stitching around the eye of the buttonhole is taking place. The cam groove 74 is designed to give more movement to the spreader frame 76 than the groove 73 gives to the frame 75 prior to the commencement of the stitching operation, and when the buttonhole is completed, while intermediate those two points, the two frames 76 and 75 move longitudinally in unison. This extra movement of the frame 76 is required in the present arrangement in order to properly spread the clamp plates 18 and 19 before the stitching operation is started, and to allow the clamp plates to resume their normal positions when the buttonhole has been completed. By the use of this arrangement it is possible to spread the clamp plates 18 and 19 at the proper time and to hold them in that condition throughout the entire stitching operation whether the clamp fingers 25, 26 are in clamping position or not.

In other words, the spreader performs its function of spreading the clamp plates and holds them in spread position without the aid of other instrumentalities to hold them in said spread condition.

In other machines of this type it has been the practice to force the clamp plates past a stationary wedge shaped member after the clamp fingers were clamped and held upon the work, the said wedge forcing the plates apart against the friction created by the mechanism that held the clamp fingers snugly to the work. This friction was depended upon to hold the clamp plates in spread condition. In the above instance it will be readily seen that if for any reason the operator should find it necessary to release the clamp fingers from the work the clamp plates would immediately resume their former lateral relative positions. For the best results it is necessary to have the upper or work piercing needle operate closely to the parts of the clamp fingers that contact with the work, and if a machine of the kind just referred to should be so adjusted, and the clamp fingers released from the work during the stitching operation, and thereafter the clamp fingers replaced on the work, it will be found that upon the resumption of the stitching the needle will strike one of the pivoted members 27 and become broken, or the needle will be deflected from its proper course. It is obvious that good work cannot be accomplished by a needle that does not travel in a path that was designed for it.

As far as known, it is new to so spread the clamp plates 18 and 19 that they remain in parallelism and whether this is accomplished by giving them an oblique movement or a right angle movement to each other is immaterial.

In this instance the frame 76 is provided with upstanding wedge-shaped lugs 90 which are normally in light contact with the rolls 91 depending from the clamp plates 18, 19 (see Figs. 4, 17, 18 and 21) and when the cam groove 74 moves the tail piece 85, motion is imparted to the frame 76 and through the lugs 90 and rolls 91 the clamp plates 18, 19 will be spread apart the required distance.

Upon the return movement of the frame 76 the clamp plates 18, 19 will be forced together by means of the springs 92 (see Fig. 21) which are mounted in the frame 80 in such manner that they bear against the outside ends of the splines or tongues 83 which as previously stated act as guide members for the said clamp plates for their spreading movements.

The frame 76 rests on the inturned flanges 92ª of the frame 80 and is slidably held in place by means of the gibs 93 (see Fig. 18).

An important feature of this invention is the arrangement of the cutting mechanism as best seen in Figs. 5, 26, 27, 29, and 30, and more particularly the manner of constructing the cutting block or anvil so that the blow delivered by the cutting lever will be transferred to a solid portion of the machine, such for instance, as a heavy bracket rigidly secured to the work table 14.

The present arrangement includes a cutting block 94 which is permanently secured to an overhanging arm 95 in turn secured to a post 96 fast with the bracket 79. The bracket 79 has suitable bearings 98, 99 to receive the under stitch frame 100, said stitch frame being provided with an elongated vertical bearing 101 to slidably support the spindle 102 having a head 103 at its upper end, and a collar 104 adapted to limit the downward movement of the said spindle 102. At its lower end the spindle 102 is slightly rounded to enable it to more readily ride up on the reciprocating cam-edged bolt 105.

The spindle 102 is adapted to be raised and lowered into and out of supporting contact with the free end of the arm 95, to which is secured the cutting block 94. It will be understood that the spindle 102 has a circular movement with the frame 100 in which it also has, as above stated, a vertical sliding movement in the bearing 101, this latter movement being given to the spindle 102 in an upward direction just before the machine reaches the position in which cutting may occur and downwardly by gravity when the machine is moved from said position. These movements are given to the spindle 102 in order to insure its being properly placed beneath the block supporting arm 95 to avoid the possibility of contacting with the side thereof and causing breakage.

To accomplish the rise of the spindle 102 the sliding cam-edged bolt 105 is used, it being guided in a suitable bearing 106 on the bracket 79 and being held in contact with the cam-shaped collar 104 by the spring 107. Viewing Figs. 26 and 27 it will be seen that the bolt 105 is in its foremost position supporting the spindle 102 firmly beneath the block 94 and it will be seen that the shock of the cutting blow will be transmitted to the strong and rigidly secured bracket 79 and not to the frame 100 or other light and delicate structure heretofore used.

The cutting lever 69 herein used greatly resembles the one used in the Reece machine, its fulcrum 68 however being situated nearer the cutting end of the lever by which a gain in cutting power is made. The end of the lever near the cam 107, which is fast on the shaft 12, is provided with the usual cam contact piece 108 which is adjustable but not shown so herein.

The under stitch forming mechanism which is carried by the frame 100 is considered a very important feature of this invention. It is adapted for high speed work, being composed of but few parts that are of comparatively light construction and therefore easy to operate, there being no harsh cams or movements in its makeup.

The curved needle is arranged to oscillate in a curved path in a vertical plane, a departure that seems to be new in machines of this class. The looper, which heretofore passed between the upper and lower needles on its way to position its loop for the lower needle to subsequently pass through, does not in this instance pass between the said needles but has a movement approximately parallel to the plane of the said needles when carrying a loop for the under needle to enter and at the proper time is given a movement approximately at right angles to said plane sufficiently to position the loop for the under needle to enter. This looper motion is indicated in top view diagram in Fig. 31, as follows: from position 120$^a$ the looper shifts laterally to position 120$^b$, and then longitudinally in a plane or line substantially parallel to the plane of movement of the under needle 114 to the extreme position 120$^c$; on the return stroke the looper takes the same path, passing close to the upper needle 132, taking a loop of upper thread therefrom, and swinging around laterally to the initial position 120$^a$. Thus the looper requires but simple mechanism to operate it and the parts are so constructed that they are not susceptible to rapid wear.

The devices to operate the under needle and the looper consist of a vertically reciprocating rod 109 which finds a bearing in the lower portion of the frame 100, the said rod having a thread passage longitudinally thereof and having at its upper end fast thereto a cross rod 110 the right end of which has pivotally mounted therein the link 111. Pivoted to the frame 100 at 112 is the curved lever 113 adapted to receive the butt of the needle 114. The link 111 connects the cross rod 110 with the lever 113 and imparts movement thereto. The pivot 112 is purposely situated close to the plane of the work, not shown, the object being to have the point of the under needle pass through the slit of the buttonhole in as nearly a straight path as possible to obviate the possibility of the needle point rubbing or cutting the edge of the slit nearest the pivot 112.

Mounted on the rock shaft 115 are the levers 116 and 117 to one of which, 116, the looper carrier 118 is pivoted as at 119, the upper portion of said carrier being adapted to adjustably receive the shank of the looper 120. The lower end of the said carrier 118 is provided with a screw 121 which passes through said carrier and finds a bearing against the pivoted curved lever 122 which is adapted to be swung toward and from said screw 121. The lever 117 as best seen in Fig. 28 is adapted to at times engage an anti-friction roller or ball 123 which contacts with the lever 122, the said ball 123 protruding through a retaining plate 124, the hole through which the ball protrudes being slightly less in diameter than the ball.

The lever 116 is connected to the left end of the cross rod 110 by the toggle-like connection comprising the arm 125 fast with the lever 116 and the link 126 pivoted to the lower end of said arm and the left end of the cross rod 110. A spring 127, one end of which is secured to the carrier 118 and its other end to arm 125 serves to keep the screw 121 in contact with the curved lever 122, and the looper 120 in the path in which it swings when carrying a loop to the needle 114. In order that the curved lever 113 may be more easily swung a tie link 128 is used, which connects the link 111 with the toggle-like connection 125, 126 at the joint thereof. When the rod 109 is raised and the lower end of the arm 125 is swung upwardly and outwardly the link 128 aids the link 111 in its effort to move the lever 113 and it will be seen that the needle and looper will move in their respective paths in harmony.

A thread tension 129 fast at the pivot of the lever 116 is provided as is also a thread measuring and guide arm 130 which moves in unison with the lever 116 and is adjustable relatively thereto by screw adjusting device shown in dotted lines in Fig. 29.

To thread the mechanism just described, the thread is passed upwardly through the rod 109 (see Fig. 29) through the eye of the guide 130 toward the rear thereof around the under portion of the tension 129 to the guide eye in the lever 113 forwardly through the lower eye of the needle 114 and rearwardly through the upper eye of said needle, thence through the throat plate 131 to the work.

The position of the arm 130 may be changed to graduate the amount of thread to be pulled from the source of supply as occasion demands.

In order to properly form the loop at the under needle 114 for the upper needle 132 to subsequently pass through, it is advisable and in fact usual to give the under needle a slight dip and return, after it has reached its highest point, and before the upper needle descends far enough to enter the loop of the lower needle to be formed. The main up and down movements of the rod 109 are controlled by the lever 133, pivoted at 134 to extensions depending from the bracket 79, the link 135 connecting said lever 133 and a cam operated lever 136 (see Figs. 1 and 2). Fast on the stitch shaft 145 is a gear 138 meshing with a similar gear 139 suitably journaled in the overhanging arm 15. The gear 139 is provided with an eccentric or crank pin 140 which forms a revolving fulcrum for the lever 136, the left end of which is bifurcated to embrace the cam 141 fast on the shaft 145.

The crank pin 140 and the cam 141 are so timed that when the rest portion 142 of said cam is in contact with the lever 136 and the needle 114 is in its highest position, the crank pin is in such position as to give successively a rapid upward and downward movement to the lever 136 independently of the cam 141 and during the period of rest of said cam 141. This action of the crank pin 140 causes the lever 136 to move from the dotted line position indicated in Fig. 2 as A to the dash or broken line position B, and back again before the cam 141 returns the said lever to its full line position.

This arrangement compared with the devices at present in use is an extremely simple and inexpensive one that is capable of withstanding long and continuous use without showing signs of wear.

The main or cam shaft 12 is driven by the pulley 16 at a predetermined uniform speed to accomplish the clamping, cutting and positioning of the work preparatory to the stitching operation, and by the pulley 17 on the stitch shaft 145 and intermediate devices at a variable speed when the stitching operation is going on.

It is an object of this invention to feed the work in a continuous manner during the stitching operation, and to cause the feed to be retarded at the time the upper needle 132 is in the work, and to accelerate the feed when the said needle is out of the work. For this purpose a variable speed control device is used in combination with other mechanism and while not new in itself it appears to be new for the purpose used in this type of machines. The mechanism controlling the feed during the stitching operation consists of a gear 146 fast on the usual stitch shaft 145, said gear meshing with a similar one 147 fast on a short shaft 148 to which is also secured the hub of a crank arm 149 (see Figs. 11 and 16). A bracket bearing 150 designed to support the stitch shaft 145 at its right end (see Fig. 11) has depending therefrom the inverted U-support for the short shaft 151, the left end of which has fast thereto the hub of a crank arm 152 and in the cored space of the support the spiral or worm gear 153 is situated fast on the shaft 151. The crank arms 149 and 152 are pivotally connected by a link 154. It is obvious that if the shafts 148 and 151 were coincident there would be no variable movement between them, but the shaft 151 is offset from the shaft 148 a predetermined amount to enable the cranks and the link to impart the required variable movement to the shaft 151. It will be understood that the cranks are so timed that the retarded motion of the shaft 151 occurs when the upper needle 132 is in the work.

The worm gear 153 meshes with a worm 155 on a shaft 156 journaled in a bearing 157 on the table 14. The lower end of the shaft 156 (see Fig. 10) has fast therewith the worm gear 158 in turn meshing with the worm 159 forming one member of a friction feed clutch loose on the shaft 12. The hub 160 of the worm 159 is so constructed as to inclose the various parts of the clutch mechanism (see Figs. 12 to 14 inclusive). The clutch is designed to drive the shaft 12 only when the worm 159 is rotated in the direction of the arrow (Fig. 14)

and when the shaft 12 is driven by the pulley 16 the clutch members automatically release themselves, but always remain in position for instant action when called upon. The worm 159 has firmly inserted in the hub thereof a hardened ring 161 which has the cam-shaped portions 162 adapted to at times coact with the rollers or pins 163 to drive the shaft 12 as when the worm 159 is rotated in the direction of the arrow.

Loosely surrounding the shaft 12 is a flanged sleeve 164 which is longitudinally slotted at 165 to receive the pins 163 at the right of the flange 166 while at the left of the said flange a slot is provided in the said sleeve to receive one end of a spiral spring 167, the other end of which is similarly secured to the inner wall of the hub 160 of the worm 159. The tendency of the spring at all times is to uncoil and by so doing lightly force the flanged sleeve 164 to the right (see Figs. 13 and 14) and consequently keep the pins 163 in contact with the contracted portions of the cam surfaces 162 ready for instant action when the worm 159 is moved. The plate 169 loose on the shaft 12 serves to further inclose the clutch mechanism and the collar 170 fast on the shaft 12 prevents movement of the clutch in that direction.

From the foregoing it will be evident that when the shaft 12 is being driven by the devices just described the main cam 72 is given a variable movement which is transmitted to the work clamp plates 18 and 19.

To control the time of operation of the above described mechanism a cam 171 is secured to the shaft 12, said cam having concentric high and low portions 172 and 173 respectively which are separated by a gradual rise 174 and an abrupt ledge 175. A cam follower 176 (see Figs. 11 and 15) vertically slidable in the table 14 is adapted to engage the under side of a spring pressed extension 177 of a bell crank lever 178. The lower arm 179 of the bell crank 178 enters a notch provided therefor in the vertically movable stop carrying member 180 which is guided in the box 181 fast with the table 14. A spring 182 is interposed between a shoulder of the member 180 and the bottom of the box 181, said spring tending to force the said member 180 upwardly. A stop projection 183 backed by a spring 184 is adapted to travel, when forced, in a groove of a segmental portion 185 of the member 180. The groove referred to is approximately concentric with the shaft 145 for a purpose to be described.

The control or stitch cam 171 and the member 180 act in conjunction with a stop motion mounted on the stitch shaft 145. As the said stop motion may be one of a variety in use it is preferred in this instance to use the type shown in patent to John Reece, No. 367,063, of July 26, 1887, which is well known in the art and for that reason it is not deemed necessary to enter into a detailed description of the same.

The drawings show the machine in starting position or about to perform the clamping, cutting, and work positioning operations, directly after which the control cam 171 comes into play to tilt the bell crank 178 and depress the member 180. It will be understood that the stitch shaft pulley 17 is continuously driven and forms part of the clutch mechanism shown and described in the said Reece patent, and the clutch dog $a^4$ is the medium through which the driving action of the pulley 17 is transmitted to the shaft 145 as is well known.

When the clutch dog $a^4$ is held from rotation by the stop lug 183 (see Fig. 1) the pulley 17 will run idly but when the member 180 has been depressed the lug 183 will be withdrawn from the path of the dog $a^4$ and the said dog will immediately assume its shaft driving position with relation to the pulley 17. The pulley 17 and coacting clutch mechanism will continue to drive the machine for the stitching operation as long as the follower 176 rides on the high part 172 of the cam 171. When, however, the follower drops off the ledge 175 to the low part 173 of said cam the spring 182 will rapidly force the member 180 upwardly, placing the stop lug 183 into the path of the dog $a^4$, thereby disconnecting said dog from the pulley 17 and instantly stopping the shaft 145. As the stitch shaft 145 travels at a high speed, the impact between the dog $a^4$ and the stop lug 183 is or rather would be harsh but for the spring 184 which backs up the lug 183, the said spring yielding sufficiently to absorb the shock of the blow to thereby prevent breakage. It will be observed that the lug 183 is adapted to move in a path concentric with the dog $a^4$ when they meet and by no chance is it possible for the dog $a^4$ to first strike the lug 183 and thereafter disengage itself therefrom, causing a disarrangement of the timing of the machine and the breakage of needles. This is a common occurrence in the stop motions at present in use, and to overcome it the lug 183 is purposely mounted in the concentric groove of the segmental portion 185 of the member 180. It is obvious that when the lug 183 is projected into the path of the dog $a^4$ it cannot be moved therefrom excepting by the action of the cam 171 previously described, and as the dog $a^4$ is inflexible the said dog and lug must remain in engagement when once they meet or until the member 180 has again been depressed through the action of the cam 171.

Briefly, the operation of the machine is as follows:

The work is placed upon the clamp plates 18, 19 in proper position to receive the buttonhole, and thereafter it may be clamped in position by manually moving the lever 29 if deemed best, or the machine may be started by the moving lever 64 which withdraws the bolt 53 and allows the pulley 16 to assume its driving position with the lever 47.

On starting the machine the work clamping devices will be immediately put into operation, quickly followed by the cutting operation, which will be completed before the cams 73 and 74 start the work clamp plates forward and spread them preparatory to the stitching operation. Up to this time the projection 50 has been riding on the low part 56 of the cam 51 and just as the plates 18 and 19 have reached the position for the stitching to commence, the said projection 50 will have ridden up on the high part 55 of the cam 51 and through the mechanism previously explained the pulley 16 will cease to drive the shaft 12 at its comparatively low uniform speed. Meanwhile the control cam 171 has gradually been brought into position for action and simultaneously with the disconnection of the pulley 16 and lever 47 the high part 172 of said cam has reached and operated to raise the follower 176 and through the bell crank 178 and member 180 the stop lug 183 has been withdrawn from the path of the dog $a^4$. The dog $a^4$ will immediately assume clutching contact with the pulley 17, which, by the way, is continuously driven at a uniform speed and the rotation of the dog $a^4$ and the shaft 145 will be transmitted to the variable speed control devices 149, 152, and 154.

The shaft 151 and gear 153 thereon are given a variable motion by the variable speed devices which is transmitted to the shaft 12 on which is fast the feed cam 72, by the gears 155, 158, 159, and through the pins 163 which become impinged between the cam surfaces 162 and the shaft 12. The variable speed of the shaft 12 continues throughout the stitching operation and consequently the work clamp plates 18 and 19 will be given a movement to correspond, moving rapidly when the needle 132 is out of the work and slowly when the said needle is in the work.

As the stitching preferably starts at the inner end of the buttonhole slit it will be evident that the work clamp plates will receive a forward longitudinal movement only and will continue to do so until the eye of the buttonhole is approached. When stitching around the eye of the buttonhole the cam 77 will cause the frame 80 to shift laterally in conjunction with the longitudinal movement and the resultant of these two movements imparted to the work clamp plates will enable the eye to be neatly and uniformly stitched as both of these movements are positive and not dependent upon springs for aid.

After stitching around the eye the remainder of the buttonhole will be stitched by a return longitudinal movement of the work clamp plates until the inner end of the slit is reached when the said movement will be arrested and movements will then be imparted to the work clamp plates which will coact with the swing of the needles 132 and 114 to produce a line barring stitches at a right angle to the slit of the buttonhole as is common in other machines of this class.

When the last stitch has been made, the follower 176 will have dropped off the ledge 175 onto the low part 173 of the cam 171 which action permits the spring 182 to force the member 180 upwardly carrying with it the lug 183 into the path of the dog $a^4$.
The said dog will meet the said lug 183 and the stitch shaft drive will be disconnected and the shaft 145 will come to a sudden stop with the needles out of the work.

Simultaneously with the drop of the follower 176 the projection 50 will have reached the low portion $56^\times$ of the cam 51 and the shaft 12 will be again driven at a uniform speed for an interval sufficient to again place the work clamp plates 18 and 19 and the cutting mechanism in position to start another buttonhole as shown in the drawings.

The needles 132 and 114 and consequently the under stitch frame 100 are given their rotary motions by means of the gears 190, 191, which mesh with the segments 192, 193 adjustably mounted on the rock shaft 194, to which is also fast the lever 195. A link 196 connects the lever 195 with the left end of a lever 197 pivoted at 198 to the table 14, said lever having a roll at its right end to engage the groove of a cam 199 (see Figs. 1, 4, and 20). When the work clamp plates 18, 19 are about to assume their final stopped position the projection 50 will ride upon the beveled face 61 of the bolt head 52, thereby disconnecting the pulley 16 from driving engagement with the shaft 12 and the machine will come to rest.
It is obvious that suitable brake mechanism may be employed to assist in the stoppage of the machine but as a variety of brakes are in use for this purpose it is not deemed necessary to illustrate one herein.
As previously stated, the clamp fingers 25, 26 will be automatically released from the work, and in fact the machine will be left in its normal position, ready to commence another operation when the said clamp plates 18, 19 have reached their final stopping position.

An especial advantage gained in the use of a vertically oscillated under needle is the fact that the over edge stitches assume positions that are more nearly at right angles to the slit of the buttonhole at the sides thereof, and that are more nearly radial at the eye than is possible to obtain in other machines wherein the under needle oscillates at a decided angle to the upper needle.

It is not intended to limit the claims to the specific construction and arrangement herein shown and described as it is obvious that the same may be changed without departing from the spirit and scope of the invention.

It is believed that the operation and many advantages of this invention will be fully understood from the foregoing description.

Having thus described my invention, I claim:

1. In a buttonhole sewing machine, stitch-forming mechanism located above the work; means for causing relative feed between the work and stitch-forming mechanism to carry the seam around the buttonhole contour; a complemental stitch-forming mechanism including a needle located below the work; means to reciprocate the said needle for its greatest throw; and means external of said first-mentioned means acting independently thereof adapted to give the said needle a supplemental reciprocation of less movement.

2. In a buttonhole sewing machine, stitch-forming mechanism located above the work; means for causing relative feed between the work and stitch-forming mechanism to carry the seam around the buttonhole contour; a complemental stitch-forming mechanism located below the work including a needle adapted to be reciprocated; a main reciprocating medium therefor; and a supplemental reciprocating medium arranged to act independently of the main reciprocating medium.

3. In a buttonhole sewing machine, stitch-forming mechanism located above the work; means for causing relative feed between the work and stitch-forming mechanism to carry the seam around the buttonhole contour; a complemental stitch-forming mechanism located below the work including a needle adapted to be reciprocated; a rotating shaft; a cam thereon; a lever having a shiftable fulcrum coacting with said cam and receiving a predetermined harmonious movement therefrom; and means to shift said fulcrum.

4. In a buttonhole sewing machine, stitch-forming mechanism located above the work; means for causing relative feed between the work and stitch-forming mechanism to carry the seam around the buttonhole contour; a complemental stitch-forming mechanism located below the work; a shaft; a cam thereon; a lever adapted to be operated by said cam at predetermined times; a gear on said shaft; a gear meshing with said first gear; a crank pin on said second gear forming a fulcrum for said lever; and connections between said lever and said complemental stitch mechanism.

5. In a buttonhole sewing machine, work clamp plates; a two-part rock shaft capable of ready separation and return, but normally held in interlocked position; clamp fingers mounted thereon; means to manually clamp the work between said plates and said fingers; and means to automatically operate said clamp fingers to clamp the work when the machine is started.

6. In a buttonhole sewing machine, work clamp plates; a two-part interconnected rock shaft; clamp fingers mounted on said two-part shaft; a work table; a rock shaft mounted thereon; means on said rock shaft adapted to engage said clamp fingers; and means to rock said shaft.

7. In a buttonhole sewing machine, work clamp plates; a two-part rock shaft having a sliding coupling connection between the two parts thereof; clamp fingers mounted on said two-part shaft; means to operate said clamp fingers; means to lock said fingers in clamped position; and means to unlock said clamp fingers.

8. In a buttonhole sewing machine, work clamp plates; a separable interconnected two-part rock shaft mounted thereon; a clamp finger secured to each part of said two-part shaft; means to operate said fingers to clamp the work; means to lock said fingers in clamped position; and means to unlock said clamp fingers.

9. In a buttonhole sewing machine, work clamp plates adapted to be moved away from and toward each other; a two-part rock shaft, each part of which is mounted on one of said clamp plates and arranged to remain in rocking engagement with the other part when said clamp plates are moved during the operation of the machine; a clamp finger mounted on each part of said shaft; means to operate said clamp fingers to clamp the work; means to lock said fingers in clamped position; and means to unlock said fingers.

10. In a buttonhole sewing machine, work clamp plates; means to spread said plates, whereby said plates will be spread in parallelism; clamp fingers coacting with said plates to clamp the work; separable rocking members upon which said fingers are mounted, adapted to remain in rocking engagement with each other when said plates are spread during the operation of the machine; means to rock said members; and means to spread said clamp plates.

11. In a buttonhole sewing machine, stitch-forming devices; work clamp plates; means to spread said plates whereby said plates will be spread in parallelism; a two-part rock shaft each part of which is mounted on one of said clamp plates and arranged to remain in rocking engagement with the other part when the said plates are spread during the operation of the machine; a clamp finger mounted on each part of said shaft; means to operate said clamp fingers to clamp the work; and means to retain said clamp fingers in spread condition regardless of the clamped or unclamped position of the said fingers.

12. In a buttonhole sewing machine, stitch-forming mechanism located above the work; means for causing relative feed between the work and stitch-forming mechanism to carry the seam around the buttonhole contour; a stitch frame located below the work; a curved needle adapted to oscillate in a curved path in a vertical plane, mounted on said second stitch frame; a looper having a loop-taking movement substantially parallel to the plane of operation of said needles, and a loop-delivering movement at approximately a right angle to said plane; and means to actuate said looper.

13. In a buttonhole sewing machine, stitch-forming mechanism located above the work; means for causing relative feed between the work and said stitch-forming mechanism to carry the seam around the buttonhole contour; a stitch frame located below the work; a curved needle adapted to oscillate in a curved path in a vertical plane; a carrier for said needle mounted on said second frame; a looper having a loop-taking movement in an uninterrupted vertical plane approximately parallel to the operating plane of the needles, and a loop-delivering movement at approximately a right angle to said plane; a carrier for said looper adapted to be oscillated; means to oscillate said carrier for the loop-taking movement; and means movable with said carrier to cause the loop-delivering movement.

14. In a buttonhole sewing machine, stitch-forming mechanism located above the work; means for causing relative feed between the work and stitch-forming mechanism to carry the seam around the buttonhole contour; a curved needle located below the work, adapted to be oscillated in a curved path in a vertical plane; a carrier therefor; a looper adapted to be oscillated in a vertical plane for its loop-taking movement and in a horizontal plane for its loop-delivering movement; an actuator common to said needle and looper; and a control device for said needle intermediate said needle and looper.

15. In a buttonhole sewing machine, stitch-forming mechanism located above the work; means for causing relative feed between the work and stitch-forming mechanism to carry the seam around the buttonhole contour; a curved needle located below the work adapted to be oscillated in a curved path in a vertical plane; a carrier therefor; a looper adapted to be oscillated in a vertical path for its loop-taking movement and in a horizontal path for its loop-delivering movement; a carrier for said looper; an actuator common to said needle and looper carriers and said connectors between said carriers and said actuator; and a control device intermediate the said needle and looper adapted to control the relative positions of said needle and looper during the oscillations thereof.

16. In a buttonhole sewing machine, stitch-forming mechanism located above the work; means for causing relative feed between the work and stitch-forming mechanism to carry the seam around the buttonhole contour; a stitch frame located below the work; a curved needle mounted thereon; a looper adapted to be oscillated; a carrier for said looper; a thread-measuring device mounted on said looper carrier; and means to actuate said carrier.

17. In a buttonhole sewing machine, stitch-forming mechanism located above the work: means for causing relative feed between the work and stitch-forming mechanism to carry the seam around the buttonhole contour; a stitch frame located below the work; a curved needle mounted thereon; a looper adapted to be oscillated; a carrier for said looper; a thread-measuring device mounted on said carrier and adjustable relatively thereto; a thread tension device on said looper carrier; and means to operate said looper carrier.

18. In a buttonhole sewing machine, stitch-forming mechanism located above the work; means for causing relative feed between the work and stitch-forming mechanism to carry the seam around the buttonhole contour; a stitch frame located below the work; a looper adapted to be oscillated in a vertical plane; a carrier for said looper; a looper-retaining block pivotally mounted on said carrier; a contact device on said retaining block; a pivoted lever adapted to cause said retaining block to swing with relation to its carrier; an arm movable with said carrier adapted to swing said lever; and means to oscillate said carrier.

19. In a buttonhole sewing machine, stitch-forming mechanism located above the work; means for causing relative feed between the work and stitch-forming mechanism to carry the seam around the button-hole contour; a stitch frame located below the work; a looper adapted to be oscillated; a carrier for said looper; a looper-retaining block pivotally mounted on said carrier; an adjustable contact stud on said retaining block; a pivoted lever adapted to cause said block to swing with relation to its carrier; means to retain said stud in contact with said pivoted lever; a rock shaft on which said carrier is fast; a lever movable with said shaft adapted to impart motion to said pivoted lever; and an antifriction contact device between said lever and said pivoted lever.

20. In a buttonhole sewing machine, stitch-forming mechanism, work clamp plates movable relatively thereto; a main shaft; cams on said shaft adapted to operate said work clamp plates; a constantly rotating pulley on said shaft; means to drive said shaft from said pulley at a uniform speed at predetermined times; and means to drive said shaft continuously at a variable speed at other times.

21. In a buttonhole sewing machine, stitch-forming mechanism; work clamp plates movable relatively thereto; a main shaft; cams thereon adapted to operate said work clamp plates; a constantly rotating pulley loose on said shaft; a dog on said shaft fast therewith; projections on said pulley adapted to at times engage said dog; a shiftable lever carried by said shaft adapted to normally hold said dog and projections from engagement; a manually-operated device to control the initial and final shifts of said lever; and means to automatically control other shifts of said lever.

22. In a buttonhole sewing machine, stitch-forming mechanism; work clamp plates relatively movable thereto; a main shaft; cams thereon adapted to operate said work clamp plates; a continuously rotating pulley loose on said shaft; a dog fast on said shaft; projections on said pulley adapted to at times engage said dog; a shiftable lever carried by said shaft adapted to normally hold said dog and projections from driving engagement; a manually-operated device to control the initial and final shifts of said lever; a work plate; and a cam fast thereon adapted to automatically control other shifts of the said lever.

23. In a buttonhole sewing machine, stitch-forming mechanism; work clamp plates relatively movable thereto; a main shaft; cams thereon adapted to operate said work clamp plates; a continuously rotating pulley loose on said shaft; a dog fast on said shaft; projections on said pulley adapted to at times engage said dog; a shiftable lever carried by said shaft; means to hold said pulley in contact with said lever; a manually operated device adapted to control the initial and final shifts of said lever for starting and stopping the machine; and a stationary cam adapted to automatically control other shifts of said lever, as, for instance, prior to and after the stitching operation.

24. In a buttonhole sewing-machine, stitch-forming mechanism; work clamp plates; a main shaft; cams on said shaft adapted to operate said work clamp plates; means to drive said shaft at a uniform speed at predetermined times; a stitch shaft; means to drive said stitch shaft at a uniform speed at predetermined times; means intermediate the said stitch shaft and the said main shaft to drive the said main shaft continuously at a variable speed including a driving connection for said main shaft that is operable only when said shaft is to be driven at said continuous variable speed.

25. In a buttonhole sewing machine, stitch-forming mechanism; work clamp plates adapted to be moved relatively to said stitch-forming mechanism; a main shaft; cams on said shaft adapted to operate said work clamp plates; means to drive said shaft continuously at a variable speed at predetermined times; and a clutch on said main shaft operable to drive said shaft in one direction.

26. In a buttonhole sewing machine, stitch-forming mechanism; work clamp plates relatively movable thereto; a main shaft; cams thereon adapted to operate said work clamp plates; a stitch shaft adapted to be uniformly driven at predetermined times; and devices intermediate said main shaft and said switch shaft arranged to drive said main shaft continuously at a variable speed.

27. In a buttonhole sewing machine, stitch-forming mechanism; work clamp plates relatively movable thereto; a main shaft; cams thereon adapted to operate said clamp plates; a stitch shaft; means to drive said stitch shaft at a uniform speed at predetermined times; a variable speed device driven by said stitch shaft; a clutch on said main shaft adapted to be operated by said variable speed device; and means to control the time of operation of said stitch shaft.

28. In a buttonhole sewing machine, stitch-forming mechanism; work clamp plates relatively movable thereto; a main shaft; cams thereon adapted to operate said clamp plates; a stitch shaft; a variable speed device intermediate said stitch shaft and said main shaft; a clutch on said stitch shaft; and means under the control of said main shaft to control the time of operation of said clutch.

29. In a buttonhole sewing machine, stitch-forming mechanism; work clamp plates adapted to be moved relatively thereto; a main shaft; cams thereon adapted to operate said clamp plates; a stitch shaft; a variable speed device intermediate said stitch shaft and said main shaft; a clutch on said stitch shaft; a cam on said main shaft; and devices intermediate said cam and said clutch arranged to automatically control the operation of said clutch.

30. In a buttonhole sewing machine, stitch-forming mechanism; work clamp plates relatively movable thereto; a main shaft; cams thereon adapted to operate said clamp plates; a stitch shaft; means to drive said main shaft from said stitch shaft at a variable speed at predetermined times; a pulley loose on said stitch shaft; a clutch member fast on said stitch shaft; a stop member adapted to be projected into the path of said clutch member; and means on said main shaft to project said stop member into said path.

31. In a buttonhole sewing machine, stitch-forming mechanism; work clamp plates movable relatively thereto; a main shaft; cams thereon adapted to operate said clamp plates; a stitch shaft; means to drive said main shaft from said stitch shaft at a variable speed at predetermined times; a pulley loose on said stitch shaft; a clutch member fast on said stitch shaft; a stop member adapted to engage said clutch member to disengage the clutch and stop the stitch shaft; a cam on said main shaft; and means to operate said stop member from said cam.

32. In a buttonhole sewing machine, stitch-forming mechanism; work clamp plates arranged to be moved relatively thereto; a main shaft; cams thereon adapted to operate said clamp plates; a stitch shaft adapted to be driven at a uniform speed at predetermined times; a gear fast on said stitch shaft; a similar gear meshing therewith; a shaft for said second gear having a crank arm fast thereto; a second shaft offset from said first shaft also having a crank arm fast thereto; a link connecting both crank arms; and gear connections between said second shaft and said main shaft arranged to drive said main shaft in the same direction as the said stitch shaft.

33. In a buttonhole sewing machine, stitch-forming mechanism including an eye-pointed needle located above the work; work clamp plates adapted to be moved relatively thereto; a main shaft; cams thereon adapted to operate said clamp plates; a constantly rotating pulley on said shaft; a stitch shaft; and means intermediate said main shaft and said stitch shaft whereby said main shaft will be driven by said stitch shaft continuously at a variable speed at predetermined times, as, for instance, a slow continuous speed while the needle is in the work and a fast continuous speed while the needle is out of the work.

Signed by me at 4 Post Office Sq., Boston, Mass., this 15th day of June, 1917.

FRED A. READ.